July 23, 1968     A. J. PACINI     3,393,678

TAMPONS AND THE LIKE

Filed Jan. 3, 1966

INVENTOR.
AUGUST J. PACINI
BY White & Haefliger
ATTORNEYS.

United States Patent Office 3,393,678
Patented July 23, 1968

3,393,678
TAMPONS AND THE LIKE
August J. Pacini, Palos Verdes Peninsula, Calif., assignor to Purex Corporation, Ltd., Lakewood, Calif., a corporation of California
Filed Jan. 3, 1966, Ser. No. 518,147
13 Claims. (Cl. 128—270)

This invention relates generally to catamenial devices in the general category of tampons or vaginal inserts which may have any of various forms, and has for its general object to improve such devices in a number of important respects, notably by imparting to them antibacterial qualities as well as physical lubricity that facilitates and lends comfort to their use.

More specifically, the invention is directed to the accomplishment of these objectives by the incorporation in or on such devices of metallic pectinate which functions beneficially with respect to physiological or pathological vaginal conditions, as well as to physical use of the devices.

Pectin is defined in the National Formulary as a purified carbohydrate product obtained from the dilute acid extract of the inner portion of the rind of citrus fruits or from apple pomace. The nucleus of the pectin molecule is a polymer of galacturonic acid and is variably methoxylated. On removing all of the methoxyl groups pectin loses many of its colloidal capabilities and becomes pectic acid exhibiting a chemical behavior toward metals similar to that of other organic acids.

In its usually available form pectin can be made into unofficial pastes such as pectin paste N.F. IX and pectin paste, thin, N.F. IX obtained by mixing 75 gms. of pectin with 180 gms. of glycerin and adding to this mixture during vigorous stirring 825 mls. of Ringer's solution containing 2 gms. benzoic acid and heated to 100° F. This paste has been used successfully in the treatment of decubitus ulcers and particularly as a vehicle for application to skin or mucous membranes in the management of pyogenic infections.

Pectin undergoes two forms of hydrolysis conveniently designated "destructive" and "constructive."

Destructive hydrolysis results in the depolymerization of pectin whereupon it degrades essentially into pectic acid and loses its ability to produce viscosity. It is characteristic of destructive hydrolysis that it occurs rapidly at room temperature when brought into a moist environment exhibiting a pH of 7 or above. The greater the pH, that is the more alkaline the environment, the more rapid is the destructive hydrolysis of pectin; and, as is common to practically all chemical reactions, the elevation of temperature such as the warmth observed in the cavities of the body, more quickly degrades the pectin.

Constructive hydrolysis involves a reduction in the size of the pectin molecule without greatly affecting the galacturonic structure. It involves mainly the removal of substances commonly accompanying pectin and requires treatment with acid as opposed to the degradation occasioned by alkali.

If certain metals, particularly copper, nickel, iron, aluminum, manganese, calcium, or magnesium are added in the form of soluble salts to a pectin dispersion an increased viscosity develops immediately. This increase varies with the nature and the amount of the metal and is a function also of the hydrogen ion concentration. The amount of metal chemically accepted by the polygalacturonic acid structure of the pectin nucleus will depend on the number of nonmethylated carboxyl groups in the molecule. For example, in ordinary experience with usually available commercial citrus pectin treated with a solution of nickel sulfate from 1% to 2% of metallic nickel will combine with the pectin. Also the nickel pectin thus formed acquires the amazing characteristic of dispersing more readily in water than does ordinary pectin. It appears that an optimum concentration conferring the quickest dispersibility in water to pectin is attained when 0.3% to 0.5% of nickel is combined with the pectin. Such pectin disperses readily even in cold water. Like ordinary pectin, metal pectinates are subject to destructive hydrolysis when exposed to alkaline media.

Some metals combine with pectin to produce metal pectinates which are considerably less dispersible than even ordinary pectin. A typical example is copper pectinate. However, it is possible to produce a multimetallic pectinate such that nickel is one of the metals and copper, iron or other choice are additional metals. The effect of this diversity of metals attached to the same molecule is characterized by conferring upon the molecule the oligodynamic effectiveness of each metal but at the same time rendering the polymer highly water dispersible by reason of the nickel pectinate the effect of which is greatly to overcome the tendency for other metals to lessen pectin dispersibility.

For example, a dispersion of pectin may be treated with a weak solution of nickel sulfate of such strength as to permit the pectin to accept 0.3% of its dry weight of nickel. This treatment only affects a comparatively few number of free carboxyl groups leaving others for the acceptance of additional metals; so that the dispersion may now be treated e.g. with a dilute solution of copper sulfate such as to add 0.3% of this metal, and then treated a third time with e.g. a dilute solution of ferrous sulfate so as to adjoin iron. The resulting compound is a polymetallic pectin molecule containing nickel, copper and iron. Any number of combinations may be similarly produced in this fashion starting with nickel, the main function of which is to confer extraordinary water dispersibility on the pectinates.

Polymetallic pectinates can be made into films or their dispersions may be sprayed or otherwise applied to materials intended for vaginal tamponing. The coating of polymetallic pectinate, for example, may be applied to the textile fabric of a vaginal tampon intended for use at the menstrual period; or if the tampon is enclosed telescopically in paper tubes better to facilitate the insertion into the vaginal vault, the outer surface of such a tube may be coated either by itself or together also with the fabric of the tampon itself. In either event the advantages that accrue from providing a coating in whatever manner to the surface of the tampon fabric and/or to the external surface of the tubular applicator if one accompanies the tampon include (1) The development almost instantly on insertion of a gelatinous film that serves the purpose of facilitating the introduction either of the tampon, or of the applicator;

(2) The liberation from the gel of galacturonic acid resulting from the destructive hydrolysis of the pectin;

(3) The liberation for diffusion over the mucosal surfaces of the vaginal vault of metal pectinates which are in reality metallic galacturonates each exerting its own characteristic bactericidal and/or protozoicidal effectiveness, depending upon the oligodynamic nature of the metal constituting the pectinate.

A distinguishing characteristic of such a coating is its ability to supply safe, harmless but powerfully effective antimetabolites that appear in proportion as they are needed to offset such bacterial infection, saprophytic and/or pathogenic, as invariably flourishes usually immediately before, practically always during and immediately following the initiation and the cessation of the menstrual flow. At these times the premenstrual, the menstrual and the post menstrual discharges furnish pabulum favorable to the multiplication of the normal or abnormal vaginal flora existing at the time of menstruation. In consequence of the augmented activities of the bacteria and protozoa at this time the normal acidity of the vaginal secretions is lessened in proportion as the infection is substantial; and a normally acid vaginal vault becomes mildly to strongly alkaline. This alkalinity, particularly at the temperature of the body, fosters destructive hydrolysis of pectin and liberates the metallic galacturonates. Nickel and iron galacturonates are strongly antibacterial and copper galacturonate is strongly protozoicidal. The combined effectiveness of the antibacterial and antiprotozoicidal action of the metal galacturonates greatly overcomes the infectious element, normal or pathogenic, that invariably accompanies menstruation and in this fashion aids substantially in overcoming practically all of the secondary malodors that so frequently accompany the menstrual function and that can give rise to social offense.

It has been observed, for example, that even in the instance of trichomonal infection tampon materials coated with a nickel, iron and copper galacturonate quickly subdue the characteristic malodor produced by this mixed infection largely in consequence of the ability of the metal galacturonates to destroy bacteria and trichomonads.

One of the unique and therapeutically effective characteristics of a polymetallic pectin coating is its inherent ability to operate as effectively as is required by the degree of infection varying from zero to maximum effectiveness all of which is dependent on the amount of alkalinity that develops in response to the degree of infection. The greater the infection, the greater the alkalinity, the greater the destructive hydrolysis of the metal pectinates and the liberating thereby of corresponding amounts of detoxifying antibacterial and antiprotozoicidal moieties. This insures active degradation products of metal pectinates neatly adjusted to meet the therapeutic requirements dictated by the kind and amount of bacterial and/or protozoal infection.

The following are illustrative examples of metallic and multimetallic pectinates prepared for use in accordance with the invention as coating compositions:

*Example I*

10 grams of pectin N.F. are wetted with sufficient 6 to 8 milliliters of SDA–40 alcohol to exclude intraparticulate air and to facilitate subsequent dispersion in water. Stir and allow the alcohol thoroughly to wet the pectin and displace all the air. When completely alcohol-wetted quickly add approximately 1500 to 1800 grams of water and stir. A viscous opalescent dispersion is obtained. Continue stirring until the dispersion is of homogeneous appearance. Make up to 2000 grams with additional distilled water and allow the mixture to stand overnight (at least 12 hours).

Add 10 milliliters of a 1.37 percent solution of hydrated nickel sulfate ($NiSO_4 \cdot 6H_2O$) which represents the concentration necessary to confer a level of 0.3% metallic nickel equivalent on the basis of the pectin content of the mixture. Stir to effect complete dispersion. The mixture assumes a faint bluish green color.

*Example II*

To the product of Example I add 10 milliliters of a 0.498 percent solution of hydrated ferrous sulfate ($FeSO_4 \cdot 7H_2O$) representing the concentration necessary to confer a 0.1% of metallic iron equivalent on the basis of the pectin content of the mixture. Stir to insure complete dispersion. The mixture turns yellowish green.

*Example III*

To the product of Example I add 10 milliliters of a 0.393 percent solution of hydrated cupric sulfate ($CuSO_4 \cdot 5H_2O$) representing the concentration necessary to confer 0.1% of metallic copper equivalent on the basis of the pectin content of the mixture. Stir to effect even diffusion throughout. The mixture is green-yellowish.

*Example IV*

Treat the product of Example II according to Example III. The final solution represents an approximately 0.5 percent solution of nickel (0.3%) ferrous (0.1%) copper (0.1%) pectinate. As in the case of the previous examples the product is suitable for coating whatever appropriate surface is desired, as for example, a tampon.

The product solutions on evaporating, leave films of metallic or polymetallic pectinates. The films may be plasticized by adding to the corresponding product solutions, glycerin, polyethylene glycol or other appropriate polyhydric alcohol so that, on the evaporation of water, a soft plastic coating remains, the plasticity being regulated by the amount of glycerin added to the solution on the basis of pectin content. Usually, desirable plasticities are obtained when the glycerin content of the mixture is from 0.5 to 5.0 percent of the pectin, or, in this example, from 0.05 to 0.5 gram of glycerin.

Illustrative uses of coatings contemplated by the invention are shown by the accompanying drawing wherein.

Figure 1:
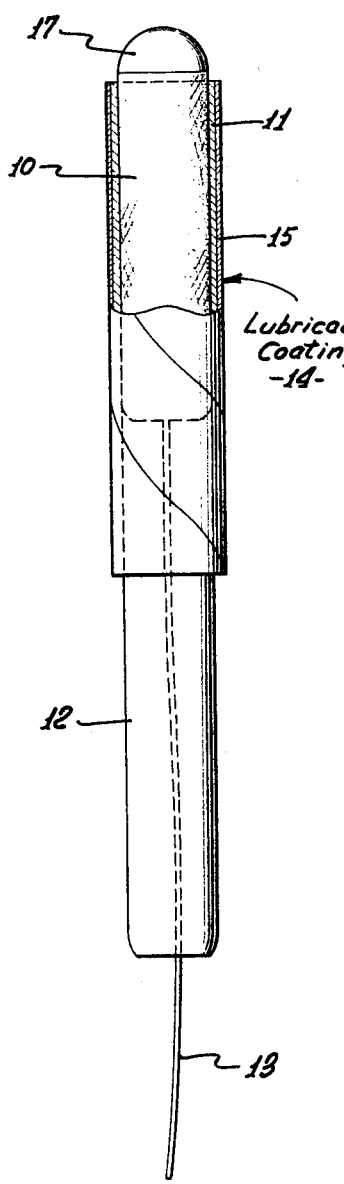
FIG. 1 is a view, partly in section, showing in general configuration a conventional type of tampon and applicator.
Figure 2:
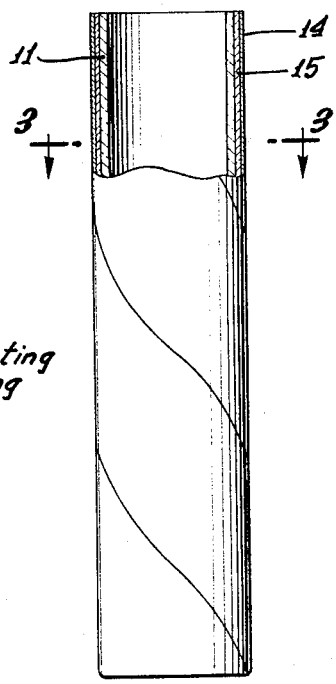
FIG. 2 is an enlarged partly sectional view of the applicator tube.
Figure 3:
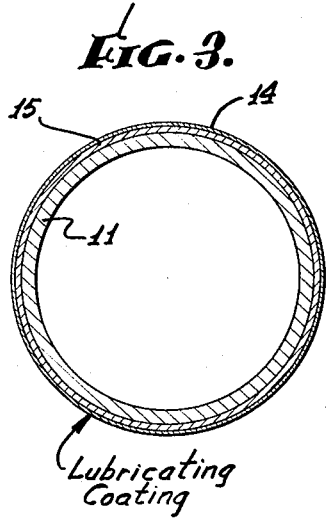
FIG. 3 is an enlarged cross section on line 3—3 of FIG. 2.

The assembly of FIG. 1 shows a tampon 10 contained within applicator tube 11 adapted to be inserted within the vaginal orifice, the tampon being projectable out of the tube by plunger section 12 through which the usual tampon string 13 extends.

Figure 4:
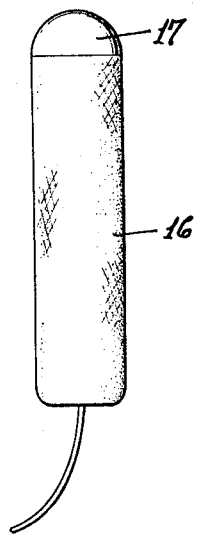
FIG. 4 illustrates a conventional tampon.

As previously indicated, the invention contemplates the application of the previously described metallic pectinate coatings in any suitable manner to either or both the tampon 10 and applicator tube 11, or to tampons, suppositories, or the like which may be used without applicators. According to the typical showings illustrated, the applicator tube 11 is shown to have a thin coating 14, the thickness of which may range upwardly of two mils, which may be applied in any suitable means either directly to a conventional applicator or to a carrier such as a wrapper 15 precoated with the pectinate at uniform thickness. The surface of the tampon 10 and particularly its tip 17 may be similarly coated, and if desired, impregnated to a degree with the metallic pectinate. Thus in reference to a tampon per se as indicated at 16 in FIG. 4, the body of the tampon being formed as ordinarily to have absorptive qualities, may be surface coated, and also impregnated, if desired, with the pectinate.

As a result of the coatings, the tampon, and applicator tube if used, are given capacity for slippery lubricity by reason of moisture solubility of the pectinate coating. Additionally, the coating in accordance with the selection of metals combined in the pectinates, will possess the various physiological properties attributed to the pectinates as discussed in the foregoing.

I claim:

1. A vaginally insertable body incorporating water dispersible metallic pectinate in a manner providing functionally effective contact with the vaginal surfaces of the user.

2. An insert according to claim 1, in which said pectinate is polymetallic.

3. An insert according to claim 1, in which said pectinate contains combined nickel.

4. An insert according to claim 3, in which said pectinate also contains a combined metal of the group consisting of copper and iron.

5. An insert according to claim 1, in which said pectinate has the form of a lubricant coating on the body.

6. An insert according to claim 1, in which said insert is a tampon device.

7. An insert according to claim 6, in which said body is coated with the pectinate.

8. An insert according to claim 6, in which said body internally contains the pectinate.

9. An insert according to claim 6, in which said body is a tampon having a tip coated with the pectinate.

10. An insert according to claim 6, in which said device comprises a tampon and applicator tube containing the tampon, said pectinate being contained in a coating on the tube.

11. An insert according to claim 10, in which said pectinate also coats the tampon.

12. An insert according to claim 6, in which said pectinate contains combined nickel.

13. An insert according to claim 12, in which said pectinate contains also combined copper and iron.

References Cited

UNITED STATES PATENTS

| | | | |
|---|---|---|---|
| 2,832,342 | 4/1958 | Wingenroth | 128—263 |
| 2,854,978 | 10/1958 | Millman et al. | 128—285 |
| 2,899,362 | 8/1959 | Sieger et al. | 167—84 |
| 3,015,332 | 1/1962 | Brecht | 128—263 |
| 3,197,369 | 7/1965 | Widmann | 167—64 |

ADELE M. EAGER, *Primary Examiner.*